United States Patent
Billings et al.

(10) Patent No.: US 7,426,921 B2
(45) Date of Patent: Sep. 23, 2008

(54) SUPERCHARGER AND AIR INLET ASSEMBLY FOR A V TYPE INTERNAL COMBUSTION ENGINE

(75) Inventors: Andy Billings, Warwick (GB); Stuart Morrison, Coventry (GB); Timothy Banks, Shipston on Stour (GB)

(73) Assignee: Ford Global Technologies, LLC, Dearborn, MI (US)

( * ) Notice: Subject to any disclaimer, the term of this patent is extended or adjusted under 35 U.S.C. 154(b) by 82 days.

(21) Appl. No.: 11/539,507

(22) Filed: Oct. 6, 2006

(65) Prior Publication Data

US 2007/0107704 A1 May 17, 2007

(30) Foreign Application Priority Data

Oct. 7, 2005 (GB) .................. 0520415.1

(51) Int. Cl.
*F02B 33/00* (2006.01)
*F02B 29/04* (2006.01)
*F02B 33/44* (2006.01)
(52) U.S. Cl. .................... 123/559.1; 123/563
(58) Field of Classification Search .......... 123/559.1, 123/563, 54.4; *F02B 29/04, 33/00, 33/44*
See application file for complete search history.

(56) References Cited

U.S. PATENT DOCUMENTS

| | | | | |
|---|---|---|---|---|
| 1,625,597 A | * | 4/1927 | Fornaca | 123/559.1 |
| 2,099,852 A | * | 11/1937 | Knudsen | 123/65 A |
| 2,265,677 A | * | 12/1941 | Straub | 123/65 BA |
| 2,654,355 A | * | 10/1953 | Scheiterlein | 123/41.74 |
| 4,932,368 A | | 6/1990 | Abe et al. | 123/559.1 |
| 5,309,886 A | | 5/1994 | Hitomi et al. | 123/570 |
| 5,911,211 A | * | 6/1999 | Uchida | 123/559.1 |
| 6,029,637 A | | 2/2000 | Prior | 123/559.1 |
| 6,758,661 B1 | | 7/2004 | Thelen | 418/206.4 |
| 6,874,486 B2 | * | 4/2005 | Prior et al. | 123/559.1 |
| 6,923,166 B2 | * | 8/2005 | Barnes et al. | 123/559.1 |
| 7,011,079 B2 | * | 3/2006 | Park | 123/559.1 |
| 2007/0169762 A1 | * | 7/2007 | Williams et al. | 123/559.1 |
| 2007/0175456 A1 | * | 8/2007 | Tally | 123/559.1 |

FOREIGN PATENT DOCUMENTS

| | | |
|---|---|---|
| DE | 102004/049027 | 4/2006 |
| DE | 102005/017971 | 11/2006 |
| EP | 1433936 | 6/2004 |
| GB | 2424450 | 9/2006 |
| WO | WO 2006/111307 | 10/2006 |

* cited by examiner

*Primary Examiner*—Thai-Ba Trieu
(74) *Attorney, Agent, or Firm*—Allan J. Lippa; Alleman Hall McCoy Russell & Tuttle, LLP

(57) ABSTRACT

In one example, a supercharger and air inlet assembly for a V8 engine comprises a supercharger, a pair of air inlet casings, and a top cover, the air inlet casings having outlet ports which align with inlet ports in the cylinder heads. The supercharger has a rotor casing, the upper sides of which extend upwards to form a peripheral wall where each inlet casing is fastened to the rotor casing by setscrews. Each inlet casing is also secured to the rotor casing by another setscrew located between two casing outlet ports. The arrangement allows the use of a relatively simple casting which simplifies manufacture and minimizes thermal stresses.

16 Claims, 7 Drawing Sheets

US 7,426,921 B2

SUPERCHARGER AND AIR INLET ASSEMBLY FOR A V TYPE INTERNAL COMBUSTION ENGINE

This application claims priority to GB Application No. 0520415.1, filed Oct. 7, 2006, the entire contents of which are incorporated herein by reference.

BACKGROUND and SUMMARY

The present disclosure relates to a supercharger and air inlet assembly for mounting between the cylinder heads of a V type internal combustion engine.

Supercharger and air inlet assemblies for engines of the above type are known. See, for example, U.S. Pat. No. 4,932,368, where a supercharger of the Lysholm screw type is mounted on the cylinder block and U.S. Pat. No. 6,837,195, where a Roots type supercharger is provided for mounting directly to the cylinder heads of a V type engine. In U.S. Pat. No. 6,837,195, the supercharger has a rotor casing and a pair of mounting flanges formed integrally with the rotor casing, each mounting flange extending laterally of the rotor casing and mounted to the adjacent cylinder head. Air from the supercharger outlet enters a plenum above the supercharger casing and flows from the plenum through air inlet pipes cast integrally with the supercharger casing and into the inlet ports in the cylinder heads. U.S. Pat. No. 6,029,637, shows a similar arrangement where there is a common wall between the air inlet pipes and the adjacent outer wall of the supercharger rotor casing. The arrangements shown in both U.S. Pat. Nos. 6,837,195 and 6,029,637, complicate the design of the rotor casing and increase the cost and complexity of manufacture, particularly where intercoolers are incorporated and the casing has to be extended to accommodate these.

The present disclosure may provide a supercharger and air inlet assembly for mounting between the cylinder heads of a V type internal combustion engines which overcomes or alleviates the above problems. is the present disclosure may also provide such an assembly where thermal expansion of the rotor casing can be accommodated without imposing undue stresses or distortions According to the present disclosure there is provided a supercharger and air inlet assembly for mounting between the cylinder heads of a V type internal combustion engine having a crankcase, first and second banks of cylinders, a first cylinder head on the first bank, a second cylinder head on the second bank, each cylinder head having a respective head inlet face and a set of head inlet ports each extending from the head inlet face into the cylinder head, the supercharger and air inlet assembly in use being mounted between the cylinder heads, the assembly comprising a supercharger having a rotor casing which includes a supercharger outlet face which in use faces away from the crankcase and defines a supercharger outlet and includes sides which in use face towards each of the banks of cylinders, a pair of air inlet casings, each air inlet casing being in use mounted to a respective one of the head inlet mounting faces and having a casing inlet opening and casing outlet ports, each casing outlet port being in use aligned with a respective head inlet port, a cover having a cover inlet face by which the cover is secured to the rotor casing at the supercharger outlet face and a pair of cover outlet faces by which the cover is secured to each air inlet casing, the cover extending over the rotor casing to form, together with the rotor casing and the air inlet casings, a plenum such that in use air from the supercharger outlet can enter the plenum and flow from the plenum through each of the air inlet casings and into the head inlet ports and a fastener arranged to secure each air inlet casing to the rotor casing at a respective one of the sides of the rotor casing.

The rotor casing may further comprise an upstanding peripheral wall which surrounds the outlet port, the wall having a top edge which forms the supercharger outlet face. Each side of the rotor casing in the region of the peripheral wall may have a side face and each inlet casing may have a side face corresponding to the adjacent side face of the rotor casing where each inlet casing is fastened to the rotor casing by the fastener. The fastener may comprise a number of elongate fasteners whose axes are substantially parallel to the supercharger outlet face.

Each inlet casing may further be secured to the rotor casing by a respective further one of said fasteners at a position between two of the casing outlet ports. The rotor casing may have a transverse wall, where each further one of said fasteners may be secured to the rotor casing in the region of the transverse wall. The rotor casing may define a rotor chamber and a bypass, the transverse wall being located between the rotor chamber and the bypass.

A pair of intercoolers may be each positioned between the plenum and the inlet opening of each inlet casing so that in use air from the plenum flows through each of the intercoolers and into the air inlet casings.

The cover may be in the form of an inverted shallow tray having a generally flat top wall and two bridge portions which are spaced from the top wall, the bridge portions having portions of the cover inlet face and the cover outlet faces where these faces are contiguous. Pillars may extend between the bridge portions and the top wall, and fasteners may extend through the pillars to fasten the cover to the rotor casing.

BRIEF DESCRIPTION OF THE DRAWINGS

Various embodiments will now be described by way of example and with reference to the accompanying drawings, of which.

DETAILED DESCRIPTION

Figure 1:
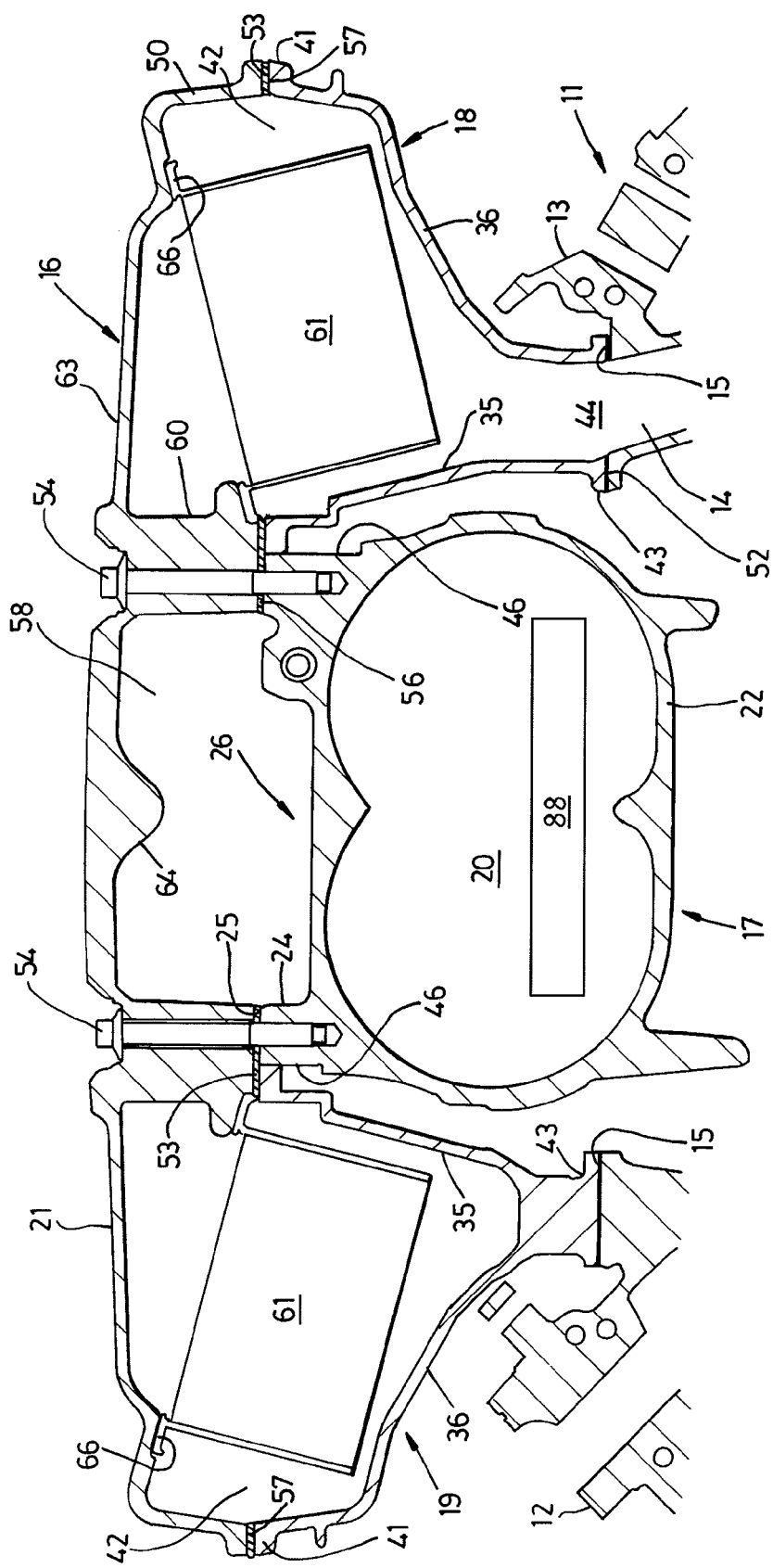
FIG. 1 is a cross-section through a supercharger and air inlet assembly according to the present disclosure mounted on the cylinder heads a V-type engine, showing part of the cylinder heads.
Figure 2:
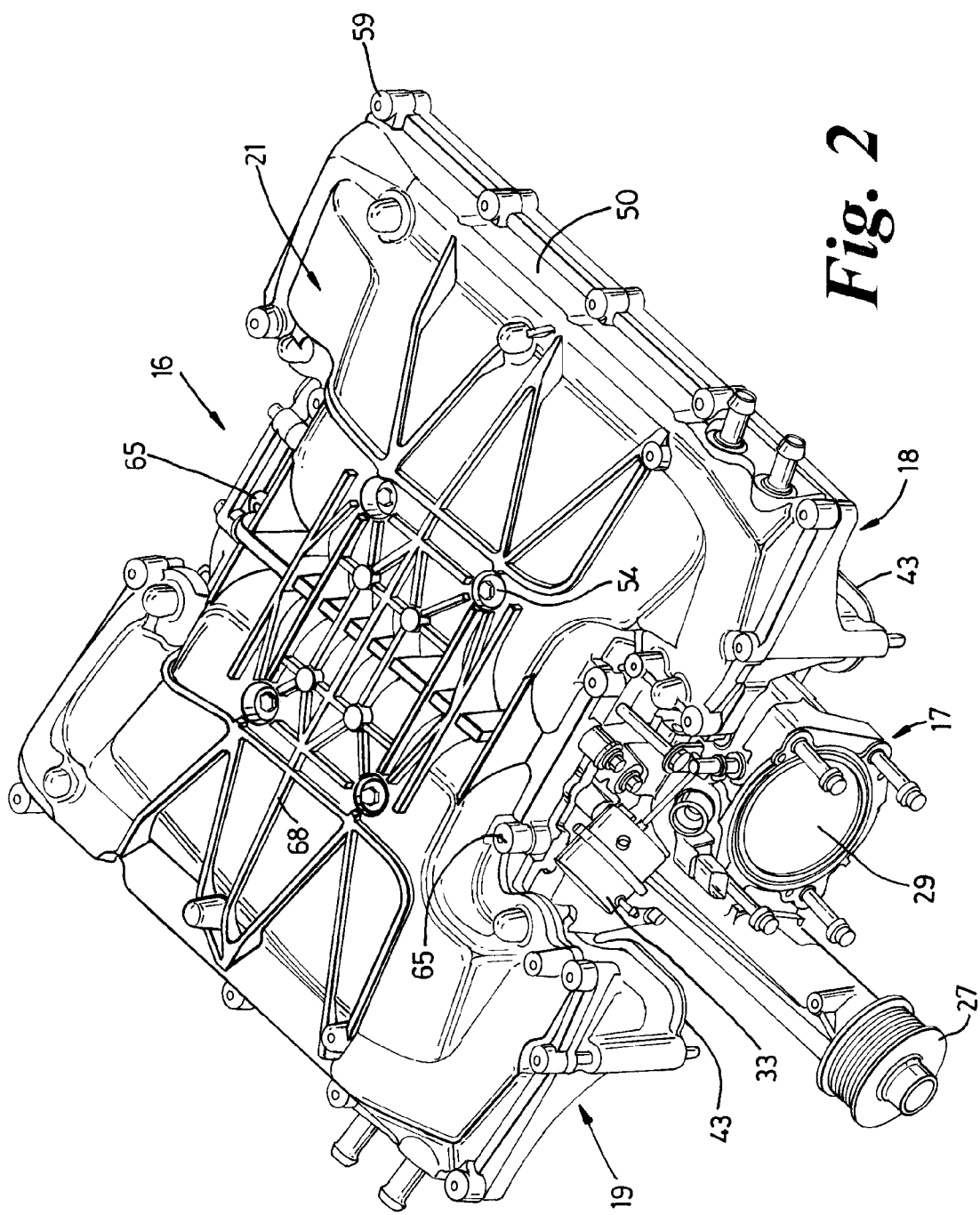
FIG. 2 is a perspective view of the supercharger and air inlet assembly shown in FIG. 1.
Figure 3:
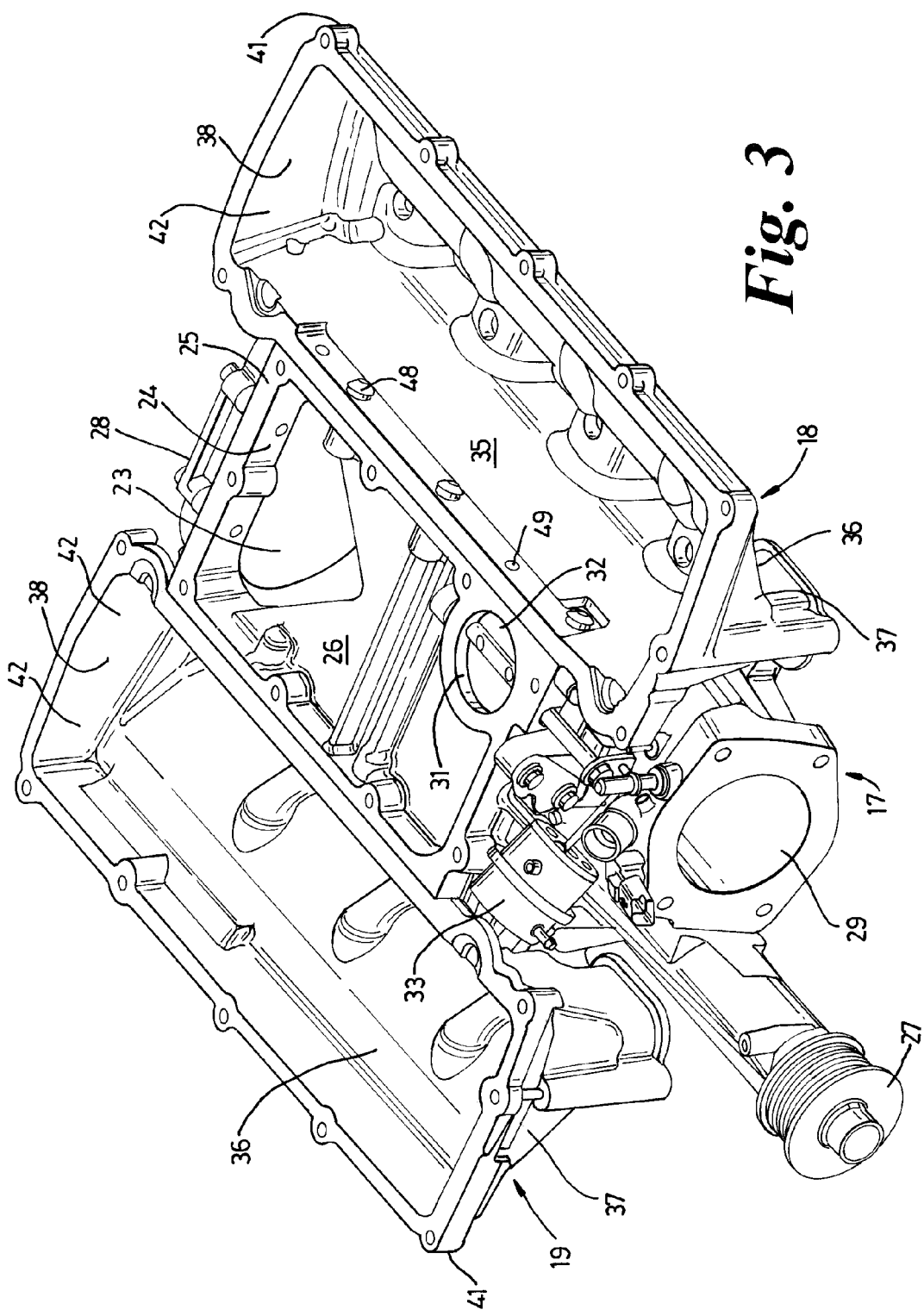
FIG. 3 is a perspective view based on FIG. 2 with a top cover removed.
Figure 4:
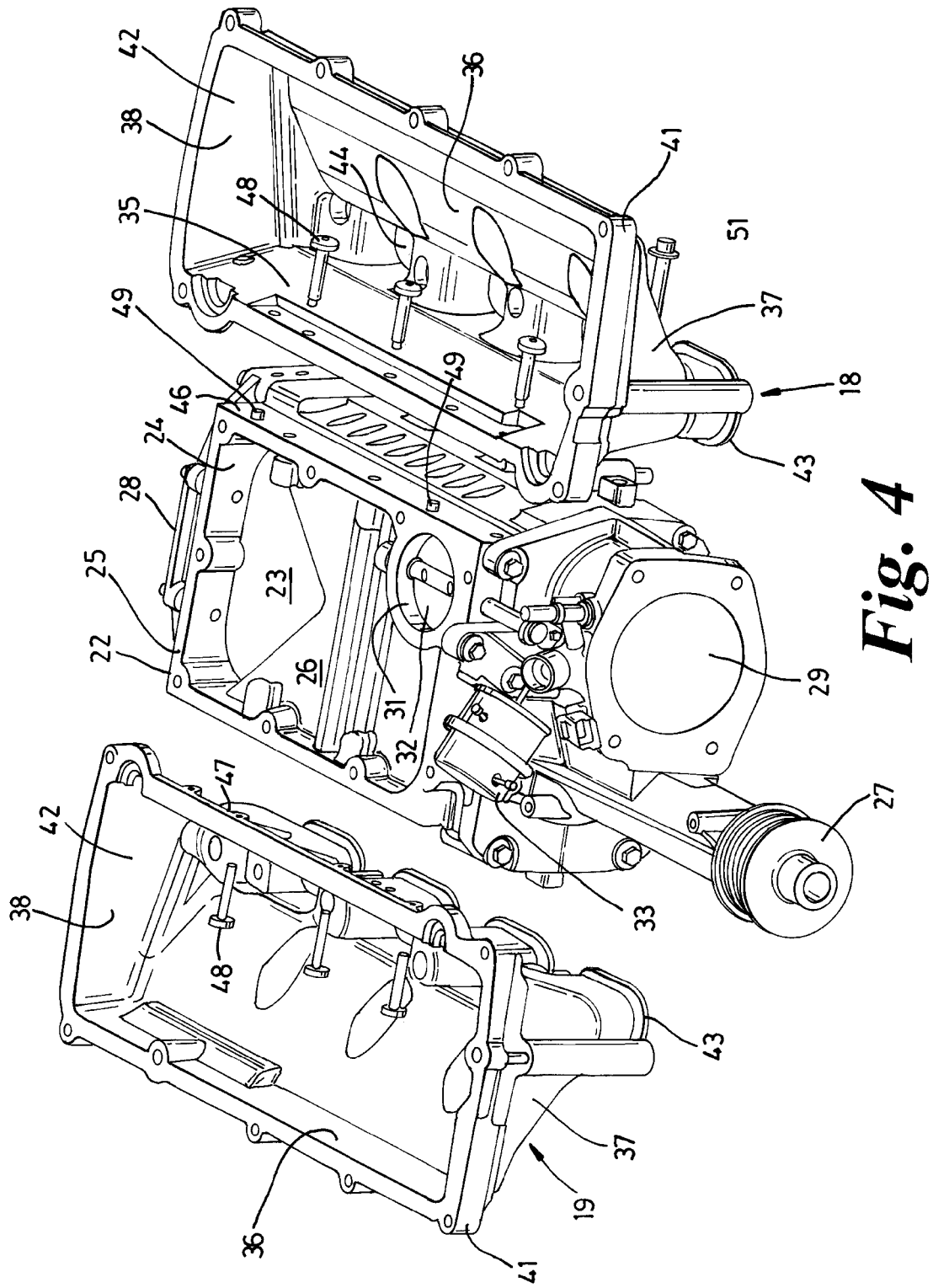
FIG. 4 is an exploded perspective view based on FIG. 3.
Figure 5:
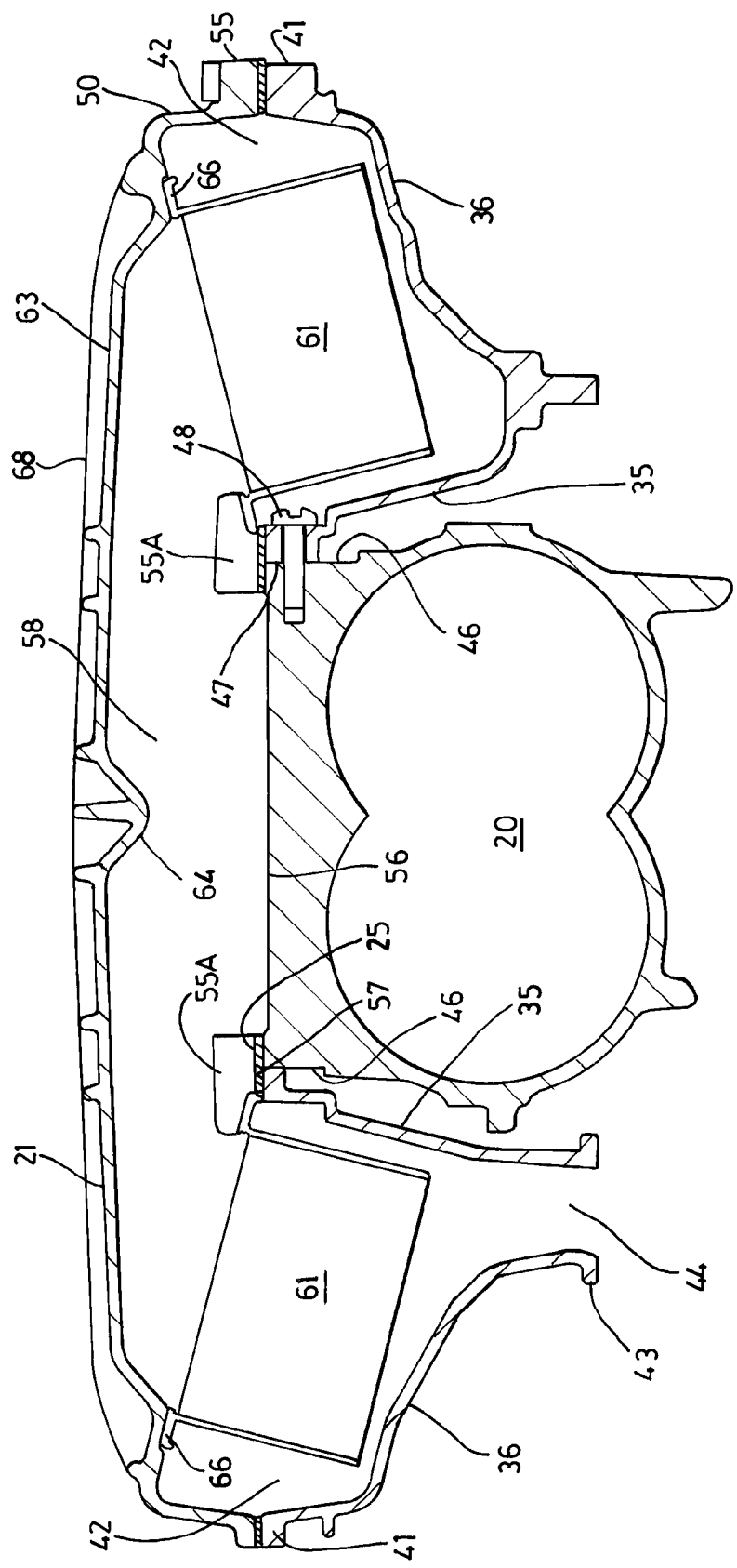
FIG. 5 is a cross-section based on FIG. 1 but in a different plane.
Figure 6:
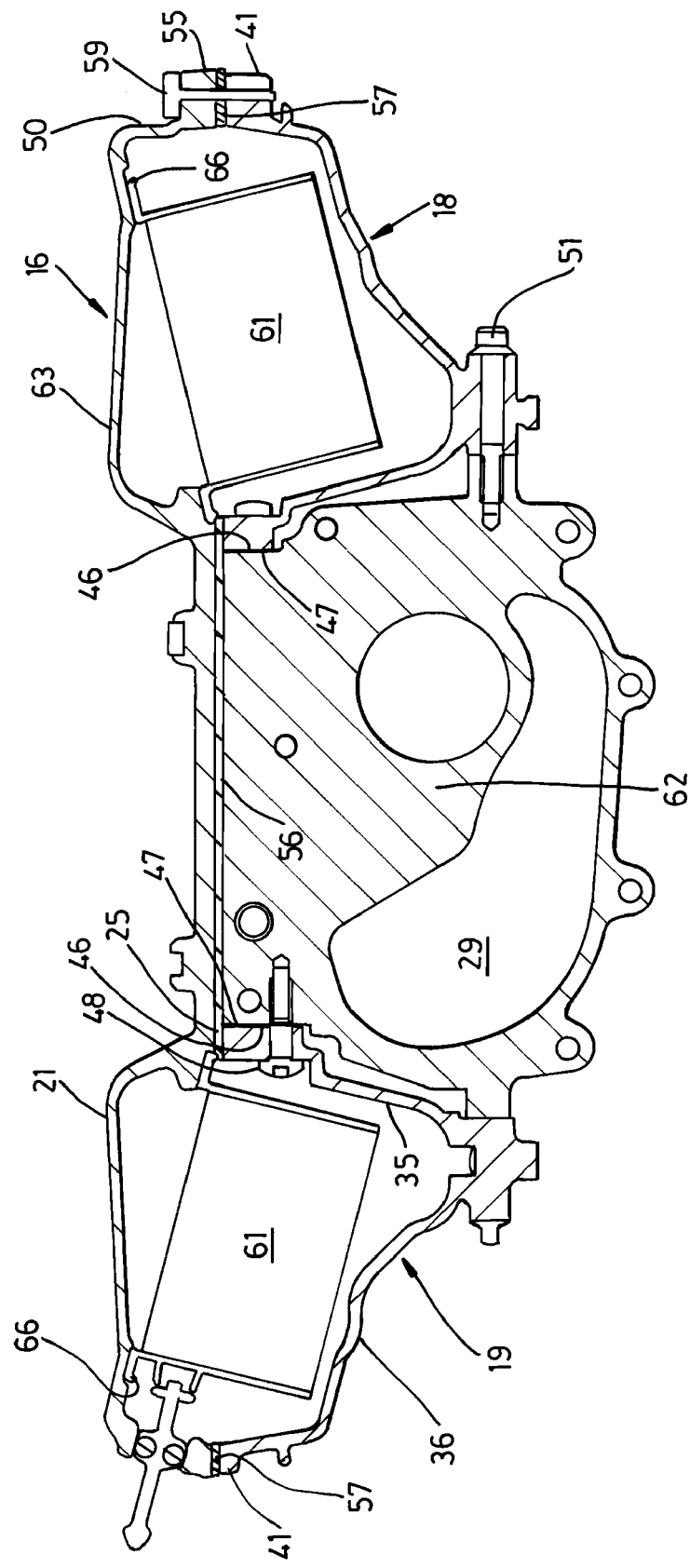
FIG. 6 is another cross-section based on FIG. 1 and in another plane.
Figure 7:
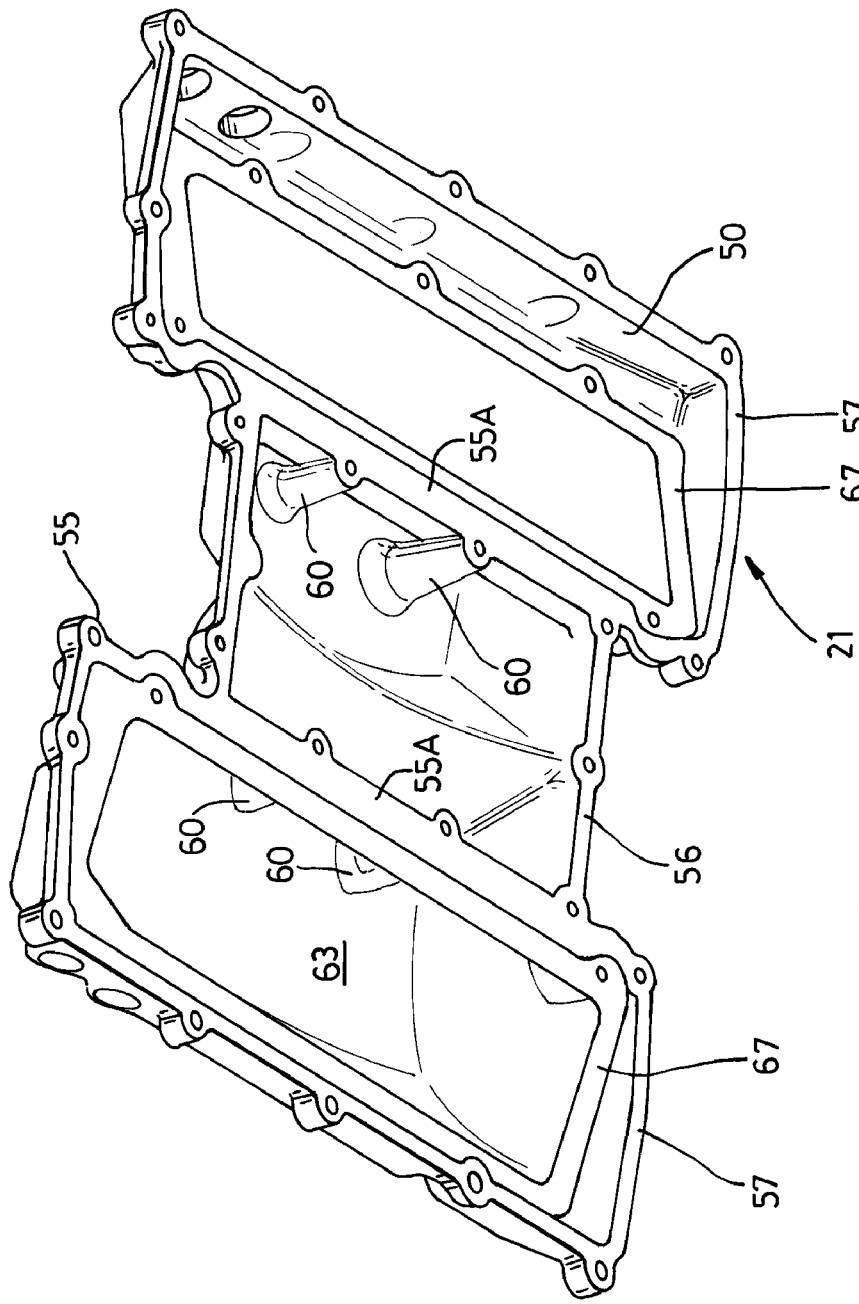
FIG. 7 is a perspective view of the cover from underneath.

A V-type engine 11, in this example a V8, has two cylinder heads 12, 13, one on each bank of cylinders. Each cylinder head 12, 13, defines with the associated bank of cylinders, a combustion chamber for each cylinder, each of which is served by a respective inlet port 14 in a conventional manner. In this example, there are four inlet ports 14 in each bank.

Each cylinder head 12, 13 has a respective head inlet face 15, the inlet ports 14 extending from the head inlet face into the combustion chambers. As will be appreciated, these inlet ports 14 may, as is well known, split to serve two or even three inlet ports in the combustion chamber itself. A supercharger and air inlet assembly 16 is mounted between the cylinder heads 12, 13, the assembly 16 comprising a supercharger 17, a pair of air inlet casings 18, 19 and a cover 21. Where the engine 11 is arranged in a conventional vertical orientation with the banks of cylinders inclined an equal amount from the vertical, then this can be conveniently be referred to as the top cover 21. However, other orientations of the engine are possible for particular applications so that expressions which indicate a particular orientation are used for convenience only.

The supercharger 17 is a Roots blower type in which two lobed rotors 88 rotate inside a rotor chamber 20 defined by a rotor casing 22, being generally as described in U.S. Pat. No. 6,758,661, incorporated herein by reference.

In the present example the rotors of the supercharger 17 are arranged side by side with their axes parallel to the axis of rotation of the engine and with an outlet port 23 at the top. An upstanding peripheral wall 24 surrounds the outlet port 23, the top edge of the wall 24 forming a supercharger outlet face 25 which defines a supercharger outlet 26. The supercharger 17 has a drive pulley 27 at one end to directly drive one of the rotors, the other rotor being driven by a pair of gear wheels in a gear casing 28 at the other end. At the same end of the supercharger 17 as the drive pulley 27 there is a supercharger inlet passage 29 and a bypass 31 in which a butterfly valve 32 is controlled by an actuator 33.

The supercharger 17 is flanked by the air inlet casings 18, 19, there being one on either side of the rotor casing 22 above each cylinder head 12, 13. Each air inlet casing 18, 19 is in the general form of an elongated trough having an inner side wall 35 which is adjacent the supercharger rotor casing 22 and slightly inclined towards it, an outwardly flared outer side wall 36 and two vertical end walls 37, 38. At the upper end of the walls 35, 36, 37, 38 of each inlet casing 18, 19 there is an upper flange 41 which defines a casing inlet opening 42 while at the lower end a lower flange 43 defines four casing outlet ports 44, each of which is aligned with a respective head inlet port 14.

Each of the upper sides of the rotor casing 22 in the region of the peripheral wall 24 has a machined side face 46 which faces the adjacent cylinder head 12, 13 and abuts a corresponding machined side face 47 on the outside of the inner side wall 35 of the adjacent inlet casing 18, 19. Each inlet casing 18, 19 is fastened to the rotor casing at the abutting side faces 46, 47 by three setscrews 48 each of whose axis is substantially parallel to the supercharger outlet face 25. The setscrews 48 pass through holes in the inner side wall and screw into threaded holes in the rotor casing 22. The inlet casings 18, 19, are also each located by two dowels 49. A transverse wall 62 extends between the rotor chamber 20 and the bypass 31 and in the region of this wall there is another threaded hole on each side of the rotor casing 22 which receives a further setscrew 51 which is inserted through a hole in the inlet casing 18, 19 located between two of the casing outlet ports 44. Thus each inlet casing 18, 19 is further secured to the rotor casing 22 at a position near the casing lower flange 43, close to the casing outlet ports 44.

Each lower flange 43 has a lower face 52 which abuts the inlet face 15 of the respective cylinder head 12, 13. Fasteners, e.g. setscrews or studs and nuts (not shown), extend through holes in the lower flanges 43 on either side of each casing outlet port 44 to secure the supercharger and air inlet assembly 16 to the cylinder heads 12, 13. Four of the fasteners are accessible from within each inlet casing 18, 19 while a fifth is also used to secure the top cover 21. The upper flange 41 of each inlet casing 18, 19 has an upper face 53 which is coplanar with the top edge of the upstanding peripheral wall 24 which forms the supercharger outlet face 25.

The top cover 21 is generally in the form of an inverted shallow tray, being fastened to the upper flange 41 of both inlet casings 18, 19 by setscrews 59 and to the supercharger outlet face 25 by four long setbolts 54 and five shorter setscrews 65. The top cover 21 has shallow sidewalls 50, a flange 55 and a generally flat top wall 63 with external stiffening ribs 68. The flange 55 defines a cover inlet face 56 to abut with the supercharger outlet face 25 and a pair of cover outlet faces 57 to each abut a respective one of the casing inlet openings 42, the flange 55 extending around the peripheral edge of the top cover 21 and also extending as two straight bridge portions 55A which are spaced from the top wall 63 and parallel with the axis of rotation of the engine 11. These bridge portions 55A include portions of the cover inlet face 56 and the cover outlet faces 57 where these faces are contiguous, pillars 60 extending between the bridge portions 55A and the top wall 63.

The top cover 21 thus extends over the supercharger rotor casing 22 and the casing inlet openings 42 to form, together with the supercharger rotor casing 22 and the air inlet casings 18, 19, a plenum 58. One of a pair of intercoolers 61 is each positioned between the plenum 58 and the inlet opening 42 of each inlet casing 18, 19, in this example being in the inlet opening 42 itself. Each intercooler 61 has a top flange 66 by which it is attached to the top cover 21 at a machined attachment face 67. The arrangement is such that in use air from the supercharger outlet 26 enters the plenum 58 and flows from the plenum through each intercooler 61 into the air inlet casings 18, 19 and into the inlet ports 14 in the cylinder heads 12, 13. The setbolts 54 extend through the pillars 60 which thus help to make a rigid connection between the top cover 21 and the rotor casing 22 without impeding air flow through the plenum 58. The top cover 21 is shaped to form an inverted ridge 64 which extends parallel to the axis of rotation of the engine to help divert flow from the supercharger into the air inlet casings 18, 19.

In a modification (not shown), a primary intercooler is positioned between the supercharger outlet 26 and the plenum 61, centrally above the supercharger rotor casing 22, and is clamped against the supercharger outlet face 23.

The arrangement described allows the for the supercharger rotor casing 22 to be made from a relatively simple casting, e.g. of aluminium alloy, which simplifies manufacture and minimises thermal stresses arising from the temperature difference between the air drawn into the supercharger and the air delivered through the outlet port. The inlet casings 18, 19 and the top cover 21 are also typically made as aluminium alloy castings so that the rotor casing 22 is well supported by the inlet casings 18, 19 (and thus by the cylinder heads 12, 13) with sufficient strength and rigidity to help tie the cylinder heads structurally and contribute to the overall rigidity of the engine. By securing the inlet casing 18, 19 to the supercharger rotor casing 22 in the region of the peripheral wall 24 and the transverse wall 62, relatively little constraint is placed on the walls of the rotor casing 22 which surround the rotor chamber 20 so that thermal expansion of the rotor casing can be accommodated without imposing undue stresses or distortions.

Instead of the setscrews 48, 51, 59, 65 or the setbolts 54, other forms of elongate fasteners may be used, e.g. studs screwed into the rotor casing 22 which receive nuts.

Although the invention has been described with particular reference to a supercharger of the Roots blower type, other types of supercharger may be used, e.g. one of the Lysholm screw type.

The invention claimed is:

1. A supercharger and air inlet assembly for mounting between the cylinder heads of a V type internal combustion engine having a crankcase, first and second banks of cylinders, a first cylinder head on the first bank, a second cylinder head on the second bank, each cylinder head having a respective head inlet face and a set of head inlet ports each extending from the head inlet face into the cylinder head, the supercharger and air inlet assembly being mounted between the cylinder heads, the assembly comprising:
- a supercharger having a rotor casing which includes a supercharger outlet face facing away from the crankcase and defining a supercharger outlet and including sides which face towards each of the banks of cylinders;
- a pair of air inlet casings, each air inlet casing being mounted to a respective one of the head inlet mounting faces and having a casing inlet opening and casing outlet ports, with at least one casing outlet port being aligned with a respective head inlet port;
- a cover having a cover inlet face by which the cover is secured to the rotor casing at the supercharger outlet face and a pair of cover outlet faces by which the cover is secured to at least one air inlet casing, the cover extending over the rotor casing to form, together with the rotor casing and the air inlet casings, a plenum, where air from the supercharger outlet enters the plenum and flows from the plenum through at least one of the air inlet casings and into the head inlet ports; and
- a securing fastener coupling at least one air inlet casing to the rotor casing at a respective one of the sides of the rotor casing.

2. The assembly of claim 1 wherein the supercharger is a Roots blower type.

3. A supercharger and air inlet assembly for mounting between the cylinder heads of a V type internal combustion engine having a crankcase, first and second banks of cylinders, a first cylinder head on the first bank, a second cylinder head on the second bank, each cylinder head having a respective head inlet face and a set of head inlet ports each extending from the head inlet face into the cylinder head, the supercharger and air inlet assembly in use being mounted between the cylinder heads, the assembly comprising:
- a supercharger having a rotor casing which includes a supercharger outlet face which in use faces away from the crankcase and defines a supercharger outlet and includes sides which in use face towards each of the banks of cylinders;
- a pair of air inlet casings, each air inlet casing being in use mounted to a respective one of the head inlet mounting faces and having a casing inlet opening and casing outlet ports, each casing outlet port being in use aligned with a respective head inlet port;
- a cover having a cover inlet face by which the cover is secured to the rotor casing at the supercharger outlet face and a pair of cover outlet faces by which the cover is secured to each air inlet casing, the cover extending over the rotor casing to form, together with the rotor casing and the air inlet casings, a plenum such that in use air from the supercharger outlet enters the plenum and flows from the plenum through each of the air inlet casings and into the head inlet ports; and
- a securing fastener coupling each air inlet casing to the rotor casing at a respective one of the sides of the rotor casing.

4. The assembly of claim 3 wherein the rotor casing further comprises an upstanding peripheral wall which surrounds the outlet port, the wall having a top edge which forms the supercharger outlet face.

5. The assembly of claim 4 wherein each side of the rotor casing in the region of the peripheral wall has a side face and each inlet casing has a side face corresponding to the adjacent side face of the rotor casing where each inlet casing is fastened to the rotor casing by the fastener.

6. The assembly of claim 5 wherein the fastener comprises a number of elongate fasteners whose axes are substantially parallel to the supercharger outlet face.

7. The assembly of claim 6 in which each inlet casing is further secured to the rotor casing by a respective further one of said fasteners at a position between two of the casing outlet ports.

8. The assembly of claim 7 in which the rotor casing has a transverse wall, each further one of said fasteners being secured to the rotor casing in the region of the transverse wall.

9. The assembly of claim 8 in which the rotor casing defines a rotor chamber and a bypass, the transverse wall being located between the rotor chamber and the bypass.

10. The assembly of claim 1 in which a pair of intercoolers is each positioned between the plenum and the inlet opening of each inlet casing so that in use air from the plenum flows through each of the intercoolers and into the air inlet casings.

11. The assembly of claim 1 wherein the cover is in the form of an inverted shallow tray having a generally flat top wall and two bridge portions which are spaced from the top wall, the bridge portions having portions of the cover inlet face and the cover outlet faces where these faces are contiguous.

12. The assembly of claim 11 wherein pillars extend between the bridge portions and the top wall, fasteners extending through the pillars to fasten the cover to the rotor casing.

13. A supercharger and air inlet assembly for mounting between the cylinder heads of a V type internal combustion engine having a crankcase, first and second banks of cylinders, a first cylinder head on the first bank, a second cylinder head on the second bank, each cylinder head having a respective head inlet face and a set of head inlet ports each extending from the head inlet face into the cylinder head, the supercharger and air inlet assembly in use being mounted between the cylinder heads, the assembly comprising:
- a supercharger having a rotor casing which defines a rotor chamber and a bypass and includes a transverse wall located between the rotor chamber and the bypass, a supercharger outlet face which in use faces away from the crankcase and defines a supercharger outlet, sides which in use face towards each of the banks of cylinders and an upstanding peripheral wall which surrounds the outlet port, the peripheral wall having a top edge which forms the supercharger outlet face and each of said sides of the rotor casing in the region of the peripheral wall having a side face;
- a pair of air inlet casings, each air inlet casing being in use mounted to a respective one of the head inlet mounting faces, having a casing inlet opening and casing outlet ports, each casing outlet port being in use aligned with a respective head inlet port and having a side face corresponding to the adjacent side face of the rotor casing;
- a cover having a cover inlet face by which the cover is secured to the rotor casing at the supercharger outlet face and a pair of cover outlet faces by which the cover is secured to each air inlet casing, the cover extending over the rotor casing to form, together with the rotor casing and the air inlet casings, a plenum such that in use air from the supercharger outlet enters the plenum and flows from the plenum through each of the air inlet casings and into the head inlet ports; and
- a number of elongate fasteners whose axes are substantially parallel to the supercharger outlet face arranged to secure each air inlet casing to the rotor casing at said side faces and at a position between two of the casing outlet ports and in the region of the transverse wall.

14. The assembly of claim 13 in which a pair of intercoolers is each positioned between the plenum and the inlet opening of each inlet casing so that in use air from the plenum flows through each of the intercoolers and into the air inlet casings.

15. The assembly of claim 14 wherein the cover is in the form of an inverted shallow tray having a generally flat top wall and two bridge portions which are spaced from the top wall, the bridge portions having portions of the cover inlet face and the cover outlet faces where these faces are contiguous.

16. The assembly of claim 15 wherein pillars extend between the bridge portions and the top wall, fasteners extending through the pillars to fasten the cover to the rotor casing.

* * * * *